United States Patent [19]

Wolfe, Jr. et al.

[11] Patent Number: 4,667,823

[45] Date of Patent: May 26, 1987

[54] PALLET-TYPE PACKAGE AND PACKAGING SYSTEM AND TRAYS THEREFORE FOR TRANSPORTING, STORING AND UNLOADING BOBBIN YARN

[75] Inventors: Homer O. Wolfe, Jr., Pittsburgh, Pa.; Allison A. Dockery, Lexington, N.C.

[73] Assignee: PPG Industries, Inc., Pittsburgh, Pa.

[21] Appl. No.: 815,602

[22] Filed: Jan. 2, 1986

[51] Int. Cl.$^4$ .......................................... B65D 85/66
[52] U.S. Cl. .................................. 206/392; 206/597; 206/503; 206/821
[58] Field of Search ............... 206/597, 391, 392, 386, 206/503, 505, 821

[56] References Cited

U.S. PATENT DOCUMENTS

| | | |
|---|---|---|
| 2,063,319 | 12/1936 | Lee . |
| 2,185,920 | 1/1940 | Martin . |
| 2,570,340 | 10/1951 | George . |
| 2,662,638 | 12/1953 | Storer et al. . |
| 2,704,600 | 3/1955 | Despres ........................ 206/392 |
| 2,710,689 | 6/1955 | Prossen ........................ 206/392 |
| 2,764,285 | 9/1956 | Prossen . |
| 2,792,112 | 5/1957 | Ellis ............................. 206/392 |
| 3,094,211 | 6/1963 | Bender .......................... 206/392 |
| 3,495,705 | 2/1970 | Limbacher . |
| 3,611,952 | 10/1971 | Hoffman . |
| 3,695,188 | 10/1972 | Granatstein . |
| 3,709,325 | 1/1973 | Gordon et al. ................ 206/392 |
| 3,730,340 | 5/1973 | Neubert . |
| 3,860,194 | 1/1975 | Roscher . |
| 3,904,030 | 9/1975 | Repp et al. ................... 206/522 |
| 3,944,070 | 3/1976 | Cardwell et al. . |
| 3,948,190 | 4/1976 | Cook, III et al. . |
| 4,042,108 | 8/1977 | Brethauer . |
| 4,098,400 | 7/1978 | Brown ........................... 206/386 |
| 4,141,447 | 2/1979 | Anderson ...................... 206/392 |
| 4,142,634 | 3/1979 | Leff et al. ..................... 206/392 |
| 4,202,448 | 5/1980 | Jaeger et al. . |
| 4,253,570 | 3/1981 | O'Connor et al. . |
| 4,482,051 | 11/1984 | Cantey, Jr. .................... 206/392 |
| 4,516,677 | 5/1985 | Rowland et al. . |

Primary Examiner—Joseph Man-Fu Moy
Attorney, Agent, or Firm—Kenneth J. Stachel

[57] ABSTRACT

A pallet-type package and system and tray therefore are provided that utilize reusable structural components of bobbins and trays. The pallet-type package has a bottom pallet layer on top of which is located at least one tray constituting the first tray layer on top of which is a layer of a plurality of nestable bobbins of yarn where subsequent layers of trays and bobbins of yarn alternate to allow the bobbins to nest through apertures in the tray. The tray of the pallet-type package positively positions the base of each bobbin in a recess having one aperture for each bobbin of yarn through which the top of the bobbin from the underlaying layer of bobbins of yarn penetrates to nest with the cavity in the base of the overlaying layer of bobbins of yarn. In addition, the tray also has material handling receiving means and has reinforcing means sufficient to provide longitudinal and transverse strength to the tray. The pallet-type package system has the pallet-type package along with a material handling means and a tray delivery means. The material handling means has a griping means to associate with the material handling receiving means of each tray, an attachment means to attach the griping means to bobbin top stabilizing means, the bobbin top stabilizing means having at least one channel per row of bobbins, connecting means to connect the material handling means to a mechanical focal point means and a mechanical focal point means whereby the material handling means can be lifted. The tray delivery means has a plurality of wheels attached to a frame to convey trays that are unloaded from the pallet-type package that are full of bobbins of yarn to the yarn utilizing machine.

21 Claims, 12 Drawing Figures

PALLET-TYPE PACKAGE AND PACKAGING SYSTEM AND TRAYS THEREFORE FOR TRANSPORTING, STORING AND UNLOADING BOBBIN YARN

The present invention relates to a pallet-type package and packaging system for bobbin yarn to transport bobbin yarn from the yarn manufacturer and, if desired, all the way to the yarn utilizing machine. Also the present invention is directed to a tray structural component of the pallet-type package and of the packaging system that is one of the package's reusable structural components.

Textile yarns have been shipped from the yarn manufacturers to their customers in sundry types of packages. The pallet-type package, which is multiple tiered with a plurality of wound yarn units per tier, and which is structured for conveyance by a forklift, is a popular packaging scheme. For instance, bobbin yarn having plastic spools with superimposed layers of wound textile yarn have been shipped in the pallet-type packages with nesting bobbins. These bobbin spools extend above and below the layers of wound yarn and allow for the bobbin tops of an underlaid layer to insert into the base of the bobbins of an overlaid layer. Packages with nesting bobbins have corrugated fiberboard interlayers between the nesting bobbins and have exterior corrugated fiberboard wrapping. With the pallet-type package, the bobbins with the wound yarn are generally: removed by hand, placed on some type of conveyance vehicle, and delivered to the utilizing machine. At this point they are unloaded and placed in some type of feeding mechanism.

Present-day, pallet-type packages for yarn may present hazards in unloading the yarn from the packages, and problems in disposal of packaging materials. Recently, bobbins with wound yarn have gotten larger and heavier. The weight of the bobbin yarn, rapidly gaining acceptance in the marketplace today, is around 20 pounds. Unloading the heavier bobbin yarn by hand presents an increased risk of injury to the individuals doing the unloading. The individuals might reach and stretch into a pallet to obtain, hold and remove the heavier bobbin yarn. If the bobbin yarn is lifted improperly or dropped, injuries to backs, feet and legs may result. In addition, dropping bobbin yarn can damage the yarn because of denting and soiling. Any fingerprints, dirt or dust placed on the yarn can be damaging or lead to quality control problems for yarn like glass fiber yarn that nicks and abrades easily. Also, the traditional corrugated fiberboard interlayer and exterior packing used with the pallet-type package are cumbersome for disposal purposes because they occupy large volumes, especially after a number of pallet-type packages have been unloaded.

It is an object of the present invention to provide a pallet-type package for bobbin yarn which requires less manual handling of bobbin yarn in loading and unloading of the bobbin yarn and which reduces the possibility of contamination from dirt, dust, fingerprints and the like, and which provides for a safer method of removing the bobbin yarn from the pallet-type package, and which provides a pallet-type package with reusable structural components as opposed to expendable exterior support material.

SUMMARY OF THE INVENTION

The aforementioned objects and other objects gleaned from the following disclosure are accomplished by the pallet-type package, tray, and system of the present invention.

The multiple-layered, pallet-type package of the present invention has: a bottom pallet layer; a plurality of layers of trays with at least one tray per layer; a plurality of layers having multiple nestable bobbins with wound yarn, where one tray layer is interspersed with one layer of nestable bobbins; lid; protective covering and unitizing means for bottom layer, tray layers, bobbin yarn layers, and lid. The trays have top and bottom planar surfaces and a plurality of row recesses formed on the top planar surface, a plurality of walls projecting vertically from the top planar surface, some in a peripheral position and some in an internal position on the tray. The walls of the tray provide for positive positioning of at least one bobbin of yarn in each recess. Also the tray has a plurality of apertures aligned in a grid-like pattern on the tray. One aperture is present for each bobbin yarn occupying each recess to enable overlaying bobbin yarn to nest with underlaying bobbin yarn. Nesting is accomplished by the tops of the nestable bobbins in the underlaying layer beneath a tray passing through the vertically aligned apertures and occupying the cavities in the base of the bobbin yarn in the layer on the tray. The tray also has reinforcement means for effective longitudinal and transverse reinforcement and material handling receiving means to allow the tray to be lifted. The lid and bottom layer of the pallet-type package can have the same or a different shape and structure. However, the bottom pallet layer has a positioning means for the first tray layer, and the lid has means adapted to receive the tops of the bobbin yarn for the last layer of bobbin yarn and to support the unitizing means. The protective film in the pallet-type package can be comprised of individual film wrappings around each bobbin yarn, around each layer of a plurality of bobbins on a tray and/or an external film wrapping around the pallet-type package.

The pallet-type package system has: the pallet-type package, a materials handling means and tray delivery means. The materials handling means has a griping means to attach to the material handling receiving means on the trays and to remove the trays from the pallet-type package and to place one or more of them on the tray delivery means. The tray delivery means conveys the one or more trays to a location around the yarn utilizing machinery to be directly or indirectly fed into the utilizing machinery. Indirect use occurs by removing the bobbins from the individual tray delivery means and placing them on a feeding device for the utilizing machinery.

The tray utilized in the pallet-type package has the row recesses that are continuous or discontinuous across and/or longitudinally along the tray. The sidewalls can have reinforcement means to provide rigidity to molded polymeric trays and to provide for the material handling receiving means. The apertures form a grid-like pattern in the tray and are of a dimension to allow a portion of the top of a nestable bobbin to penetrate the aperture, but also to allow for the tray to rest on shoulders or flanges near the top of the bobbin further down a longitudinal neck at the top of the bobbin. The tray rests on the bobbin shoulders or flanges to avoid the tray contacting the multiple layers of yarn wrapped around the bobbin.

BRIEF DESCRIPTION OF THE DRAWINGS

FIG. 1 shows a partial broken away view to illustrate the nesting of bobbins of yarn in the pallet-like package;

FIG. 6 is a photograph showing the underside of bottom planar surface of the tray of FIG. 5;

FIG. 8 is a photograph of the bottom pallet layer of FIG. 7 with the tray of FIG. 5 removed;

FIG. 9 is a photograph of the top planar surface of the lid for the pallet-type package of FIG. 1;

DETAILED DESCRIPTION AND PREFERRED EMBODIMENT OF THE INVENTION

Figure 1:
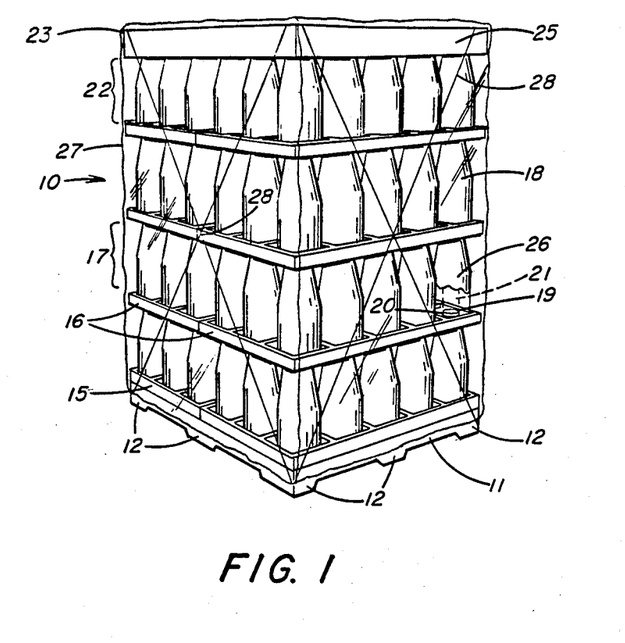
FIG. 1 is a schematic view of an exemplary pallet-type shipping package according to the present invention showing layers of bobbins of yarn separated by tray layers along with a bottom layer, lid, protective wrap and unitizing means. Also

In the embodiment of the invention shown in FIG. 1, numeral 10 indicates the pallet-type package for a plurality of bobbins of yarn which is comprised of layers of at least two reusable structural elements. At the bottom of the package 19, a pallet layer 11, has a plurality of legs, 12 whereby access to the underside of the pallet layer by the tines or forks of a lift or truck is possible between the legs 12. On top of the pallet layer 11 is at least one positioning means 13 (not shown in FIG. 1 but shown in FIGS. 9 and 10). The positioning means associate one or more trays 15 with the bottom layer 11. The positioning means encompass the bottom tray molded into the pallet layer or the one or more trays 15 as separate articles from the pallet layer. A plurality of trays 15 are arranged in multiple tray layers 16 in package 10. Each tray layer 16 may be comprised of at least one tray, but preferably is comprised of two trays 15. Interspersed between the tray layers 16 are layers 17 of a plurality of nestable bobbins of wound yarn. For the nestable bobbin of wound yarn 18, any nestable bobbin known to those skilled in the art can be utilized. In the cutaway in FIG. 1, the nestable relationship between the bobbins of yarn 18 is shown. The top portion 19 of one bobbin passes through an aperture 20 (described later) in the tray 15 and enters a cavity 21 in the bottom of the overlaying nestable bobbins of yarn. On the last layer 22 of plurality of bobbins of yarn 18 is lid 23 which can be the same as tray 15 as in the other tray layers 16 or which can be at least one solid rectangular article having a top and bottom planar surface with bobbin top receiving means 24 (more fully described in FIGS. 9 and 10). Means 24 accommodate the bobbin tops 19 of the bobbins in the last bobbin layer 22. The lid 23 also has a plurality of side panels 25 to extend down the sides of package 10 to protect the yarn 26 on the upper portion 27 of the bobbins 18. All of the sides of the pallet-type package 10 except for the bottom can be and preferably are covered with a protective film 27. It would be possible also to have the film 27 cover the bottom of the pallet package although this is not necessary to protect the cleanliness of the yarn on the bobbins in the pallet-type package 10. The protective film can be any plastic film known to those skilled in the packaging art and having a thickness up to around 4 mils. Nonexclusive examples of such films are polyethylene film and shrink wraps and/or stretch wrap films and the like. In lieu of or in addition to film 27, it is possible to have film coverings on the individual bobbins of yarn 18 and/or layers of bobbins of yarn 17 or any portions thereof. The pallet package can be secured by unitizing means 28 which can be any strappings to facilitate handling of the pallet-type package as a unit. Any strapping known to those skilled in the art of packaging pallets can be used such as plastic or metal strapping. The strapping can encompass the package in any manner known to those skilled in the art. In the pallet-type package 10, three reusable structural units are bottom pallet layer 11, and the nestable bobbins 18 arranged in multiple layers, the interspersed layers 16 of reusable trays 15.

Figure 2:
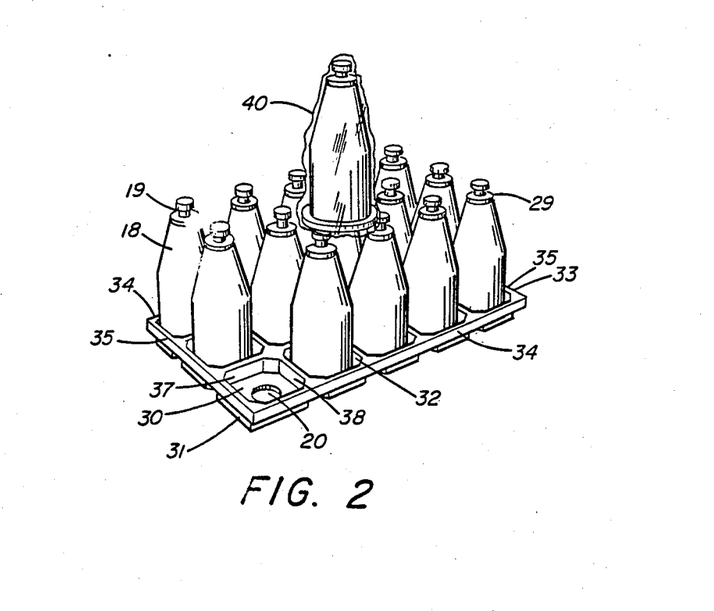
FIG. 2 is a perspective view of one-half of a layer of bobbins of yarn and a tray from a two-tray, tray layer with one bobbin of yarn removed from the tray to show the recess and aperture portion of the tray.

FIG. 2 depicts a single tray 15 which preferably constitutes one-half of a tray layer 16 in FIG. 1. Also FIG. 2 depicts the disposition of one-half of a layer of bobbin yarn 17 of FIG. 1. When more than one tray 15 is used to make up a tray layer in the palletized package 10, no special device is needed to interlock the trays when unitizing means 28 is used about a pallet-type package 10 in FIG. 1. In lieu of or as the unitizing means 28, interlocking mechanisms could be used between a plurality of trays making up a tray layer 16. As shown in FIG. 2, one bobbin of yarn 18 has been removed from the tray to show some of the features of the tray 15. The nestable bobbin of yarn 18 has the bobbin top 19 for nesting and a shoulder 29 on which rests the overlaying tray of the next tray layer. In this fashion the overlaying tray or trays do not contact the wound yarn 26 on the bobbin of yarn 18. The tray 15, which is generally of a solid rectangular shape with a top planar surface 30 and a bottom planar surface 31 has a plurality of recesses 32. In the embodiment of FIG. 2, each recess has an aperture 23, centered in the bottom layer 24, of the recess. The recess 32 is defined by the bottom layer which is the top planar surface 30 and peripheral walls 33. The walls 33 can be arranged in any geometry to accommodate the bottom of one or more bobbins of yarn 18. Generally the walls can be arranged to form cylindrical recesses or rectilinear recesses. The tray 15 can have the plurality of recesses 32 arranged in rows so that there is one recess 32 for each bobbin of yarn 18 so that the bobbins of yarn 18 are positively positioned and secured in the tray. With one bobbin of yarn 18 for each recess 32, each recess 32 has one aperture 20. The aperture 20 is of a dimension to accommodate the bobbin top 19 to allow the nesting of the bobbin top 19 with the cavity 21 in the bottom of the bobbin of yarn 18 of an overlaying layer of bobbin yarn 17 directly above the bobbin yarn of the underlaying layer beneath tray 15. One of the walls for all of the recesses which have a peripheral position of the tray is formed by a longitudinal wall 34 or a traverse wall 35 along tray 15. In addition, the interior recesses 36 are formed by interior longitudinal walls 37 running through the interior of tray 15 on the top planar surface 30, or interior traverse walls 38 running through the interior of the tray 15 on the top planar surface 30 from which both the longitudinal and traverse walls vertically project. Where the interior longitudinal walls 37 meet the interior traverse walls 38, an intersection point 39 is formed. Only one internal or external longitudinal wall and only one internal or external (peripheral) wall on the tray need be near continuous. These walls would have metallic reinforcement means (shown in subsequent figures) to provide effective longitudinal and transverse reinforcement for the tray. All the other longitudinal and transverse walls can be discontinuous through the tray to act more as stops for the recesses. Also the type of internal wall, i.e., whether longitudinal or transverse can be varied where the walls are arranged to form recesses that have more than one aperture and where the walls of the recess positively position more than one bobbin of yarn. Hence, the tray could have only internal traverse walls or internal longitudinal walls or a mixture thereof. As shown in FIG. 2, each bobbin 18 can be individually wrapped with a film covering 40 to provide cleanliness for each bobbin. The film covering 40 can be any polymeric film known to those skilled in the art for use in packaging such as polyethylene film having a thickness from about 0.5 up to around 1.5 mils. The film covering cannot be so thick as to retard the nesting of the bobbin top 19 into cavity 21 of the base of the adjacent overlaying bobbins of yarn. Therefore, the thickness of the film must allow for movement of the film to allow for proper nesting. Various structures of the trays are further shown in FIGS. 5–6.

Figure 3:
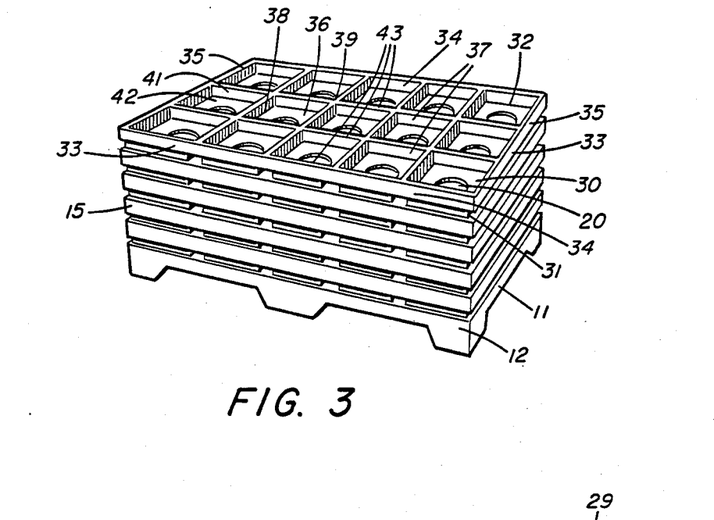
FIG. 3 is a perspective view of stacked trays from a pallet package that has two-tray, tray layers after all of the bobbins of yarn have been removed from the pallet-type package.

Referring to FIG. 3, some of the features already described for the tray 15 are shown along with several additional features. FIG. 3 indicates the nestability of trays 15 when the bobbins of yarn 18 have been removed from the trays. This nestability assists in returning the trays for reuse with other bobbins of yarn at the yarn manufacturer. In FIG. 3, the nestability is for the trays 15 which are structured so that it takes two trays to make a tray layer 16 for the pallet package 10. In FIG. 3 the bottom pallet layer 11 is indicated as being a separate article from the first tray 15 as opposed to a single unit. Generally the bottom layer 11 is of sufficient dimensions to accommodate at least one tray 15 and preferably two trays 15, each tray having fifteen recesses in a honeycomb pattern where each recess 32 securely holds one bobbin of yarn as shown in FIG. 2. As indicated, the recesses are adjacent to each other and are separated by interior longitudinal and transverse walls 37 and 38, respectively, or are bounded by exterior longitudinal and transverse walls 35 and 35, respectively of the tray 15. The tray 15 can be formed of any moldable material, such as polyethylene, particularly high density polyethylene. The shape of the tray is a solid rectangle, and the tray can be perceived as having two planar surfaces, a top planar surface 30 and a bottom planar surface 31. The top planar surface 30 has the rectangular grid 4 of walls composed of a plurality of external and internal longitudinal walls, 34 and 37, respectively, and external and internal transverse walls 35 and 38, respectively. Beneath the grid 41 is the top planar surface 30 which comprises the bottoms of the recesses 32. Although the grid 41 has been described as being formed with rectilinear walls, the walls can be circular to define a circular recess which will accommodate the circular flange (to be described) of the bobbin of yarn 18. The walls of grid 41 should have a sufficient height to positively position at least the flange of bobbin of yarn 18. Although the tray 15 has been defined as having a grid and top and bottom planar surfaces, the tray is one solid rectangular piece which can be manufactured from the polymer by any method known to those skilled in the art including: compression molding, injection molding and the like.

The apertures 20 in the tray 15 are of a dimension to receive the tops of the bobbins of yarn 19 in FIG. 1, where the bobbins of yarn are aligned directly below the tray and the tray rests on the shoulders of the tops of the bobbins of yarn of the underlaying layer of bobbins of yarn. The shaped and dimensioned apertures 20 securely maintain the tops of the bobbins of yarn of the underlaying bobbin layer in conjunction with the tray or trays on which bobbins of yarn of the underlaying layer of bobbin yarn are placed, where the tray effectively and securely holds the bottoms of the bobbin yarn.

Figure 4:
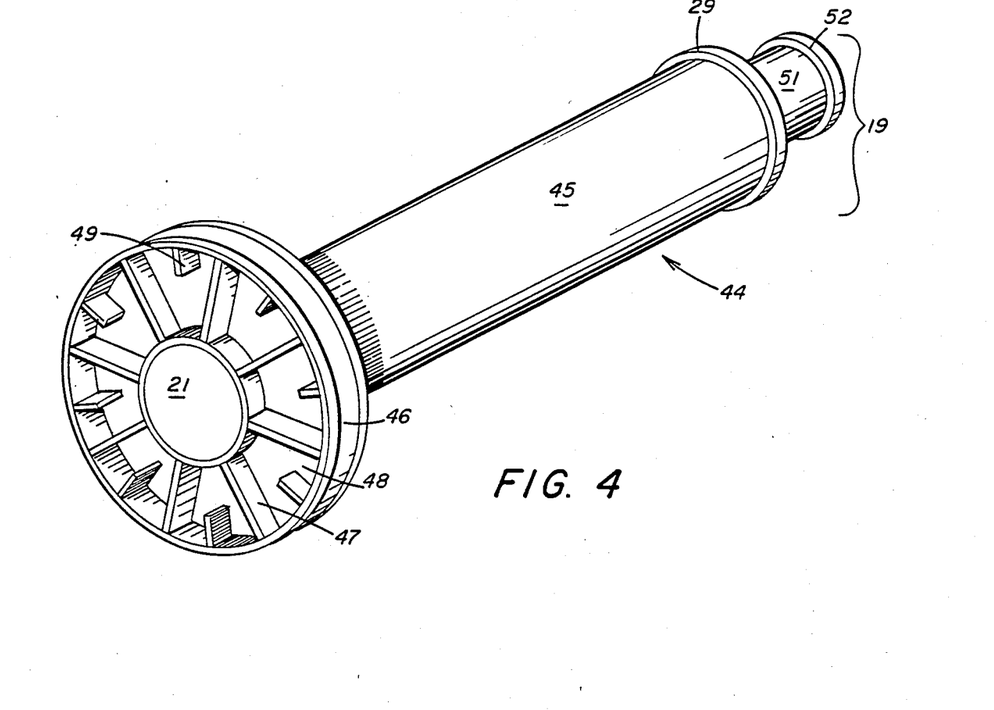
FIG. 4 is an isometric view of the bobbin utilized in the instant invention laying on its side and resting on the flange to show the core, base which is a flange, and top which includes shoulder, neck and upper portion.

In FIG. 4 there is shown a bobbin generally indicated as 44 which is comprised of a core 45. The core 45 terminates at one end at a circular flange 46 and at its other end at a top member generally indicated as 19. The core 45 can be a barrel or a tube or can also be a solid except at the base near the flange where the body has a cavity 21. If the body is tubular, the cavity 21 is the lower portion of the hollow or lumen of the tube. FIG. 4 is one example of a nestable bobbin although any nestable bobbins known to those skilled in the art can be used in the present invention. Another nonexclusive example of a suitable nestable bobbin is given in U.S. Pat. No. 3,860,194, hereby incorporated by reference. Preferably the bottom flange 46 has a plurality of spaced supports 47 that are intimately molded to the inner walls of flange 46 and to the outer wall of core 45 which extends a distance into the flange and to the upper inner surface of flange 46. A plurality of the flange supports 47 are spaced so as to effectively divide the bottom of flange 46 into a plurality of segments 48. Located in each of the segments 48 are vertical support members 47 which are molded to the upper inner surface and inner wall of flange 46. The vertical supports 49 extend along the inner surface of the flange 46 about 10 to 13 millimeters and along the surface of the inner wall of flange 46 about 8 to 11 millimeters and are generally triangular in shape. If the core 45 of the bobbin 44 is not solid with a cavity 21 near the flange 46, but is a barrel, the lumen can have vertical supports 49 to provide structural stability for the bobbin. The surface of the core 45 can have any type of roughened surface such as ribs or knobs and the like or can be a smooth surface. The top member 19 of the bobbin 44 is provided with a base 50 which connects it to the core 45 and shoulder 29 with a neck 51 rising from the shoulder 29 and terminating in a circular collar 52. For nesting, the neck 51 and circular collar 52 of the top 19 can insert into the cavity 21 at the flange of a vertically adjacent bobbin in the next higher layer of bobbins of yarn in the pallet-type package 10.

Figure 5:
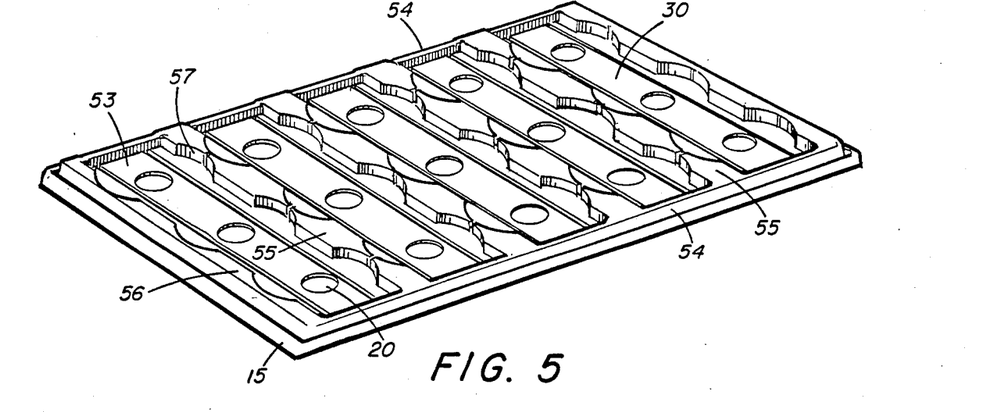
FIG. 5 is a photograph showing an isometric view of the top planar surface of a tray having only internal traversing walls and four peripheral walls to form row recesses, where each recess has a plurality of spaced-apart apertures.

FIG. 5 illustrates the preferred embodiment of tray 15 that have row recesses capable of positively positioning a plurality of bobbin yarn in each recess. The row recesses 53 have a plurality of apertures 20 to accommodate one bobbin yarn per aperture 20. The grid-like pattern 43 of the apertures is seen on the top planar surface 30. The embodiment of this tray 15 has only traverse walls 54 as the internal walls on the top planar surface 30. There is no grid of walls as for the tray of FIG. 3. Here the walls forming the row recesses yield a ladder-like pattern on the top planar surface 30 of tray 15 where the ladder is capped with a top and bottom rung. The ladder-like pattern is formed by the two external longitudinal walls 54, the rungs are the internal traverse walls 55 and the capping top and bottom rungs are the external traverse walls 56. The height of the transverse walls and external longitudinal walls are the same as the walls in FIG. 3. The recesses formed by the walls have the same depth as the recesses in the tray illustrated in FIG. 3 and the grid-like pattern of apertures is the same as for the tray illustrated in FIG. 3 except now a plurality of apertures 20 reside in each recess 53. To positively position the plurality of bobbin yarn 18 within each recess, 53 the transverse walls 55 have arcuate shaped segments 57 to contact the flange 46 of FIG. 4 of the bobbin yarn 18 at FIG. 1. The transverse walls 55 do not have to be continuous across the width of the tray but they can be discontinuous between the arcuate shaped segments 57 except that at least one of the transverse walls 55 should be continuous across the tray in order to provide sufficient strength for the tray in that direction. The external longitudinal walls 54 can be continuous to discontinuous rectilinear walls although preferably they are continuous walls.

The external longitudinal walls 54 project below the surface of the bottom planar surface 31 as shown in FIG. 6. This figure shows the underside of tray 15 having just the transverse internal walls 55. As shown in FIG. 6, the transverse walls 55 are hollow where they correspond to sections other than the arcuate segments 57 of the top planar surface 30. These hollows are depicted in FIG. 6 as 58. The bottom planar surface 31 also has the grid-like pattern 43 of apertures. The section of the external longitudinal walls that project below the plane of the bottom planar layer 31 forms a type of lip running lengthwise on both sides of the tray. Within this lip or channel 59, the reinforcing means 60 for the tray can be located. The tray 15 also has one or more reinforcement means that provides effective longutidinal and transverse support or strength for the tray. The reinforcement means can be strong support material like metals such as stainless steel, steel or aluminum in the shape of a T, bar, angle, or a flat plate. The reinforcement means 60 is installed along at least one exterior longitudinal wall 54 and/or installed along one or more of the internal longitudinal walls 54, if any, within a hollow inside the wall like the hollow 58 shown for transverse walls 55 as shown on the bottom planar surface 31 in FIG. 6. In addition, the tray can have transverse reinforcement means along the external traversing wall 56. The longitudinal reinforcement means 60 are preferably attached to the tray along the two exterior longitudinal walls 54 behind lip 59. It is also preferred that the external traversing walls 55 have a lip 61. It is possible if lips are not present for the reinforcement means 60 to constitute the external walls of the tray 15.

In addition, the tray has two material handling receiving means 62 and 63 so that a material handling device can securely lift the tray and remove it from the pallet-type package. Any receiving means known to those skilled in the art for lifting solid objects can be used such as hooks, metal eyelets and the like. Preferably the receiving means 62 and 63 are the lips 61 along the external traversing walls 56. The receiving means could be along the external longitudinal walls although removing the trays from a pallet-type package in this manner would be burdensome. It is preferred to have a tray 15 as shown in FIGS. 5 and 6 which has 5 row recesses in each tray positively positioning 3 bobbins of yarn per recess. Also it is preferred to have two trays to make up a layer of trays in a pallet-type package to give 4 layers of trays. Preferably the tray has the dimension of 26×45 inches and the pallet-type package has dimensions of 45×52×74 inches. Preferably the tray has a total height or thickness of around 2 to 3 inches.

Figure 7:
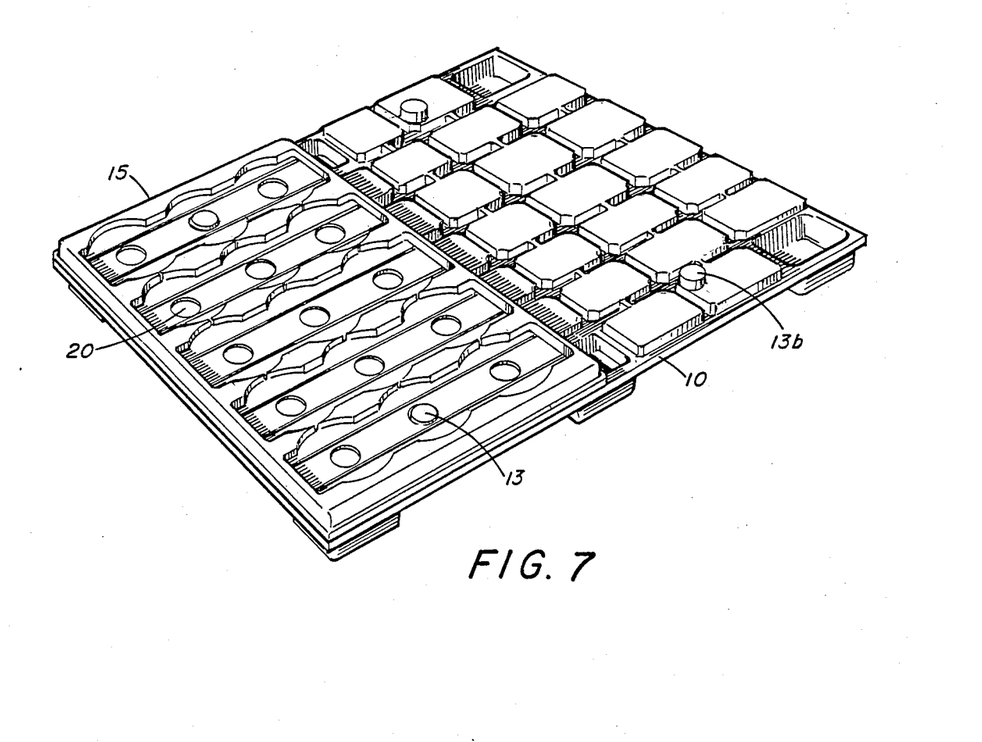
FIG. 7 is a photograph of the bottom pallet layer with two positioning means per tray and a capacity of two trays for the tray layer, where the bottom pallet layer has one tray of FIG. 5 positioned on it.

FIG. 7 shows the bottom pallet layer 11 having one tray 15 positioned on it, where it takes two trays to constitute one tray layer in the pallet-type package 10 of FIG. 1. The tray 15 is positioned on bottom pallet layer 11 by two positioning means 13 occupying the apertures 20 of the tray 15. The positioning means 13 can occupy any of the apertures 20 in tray 15, and more than two positioning means can be used. The positioning means 13 for a second tray are shown in FIG. 7 at 13b. Although the bottom pallet layer 11 in FIG. 7 has a grid-like pattern, such a pattern is not necessary except such a pattern may be useful in molding the bottom pallet layer.

Figure 10:
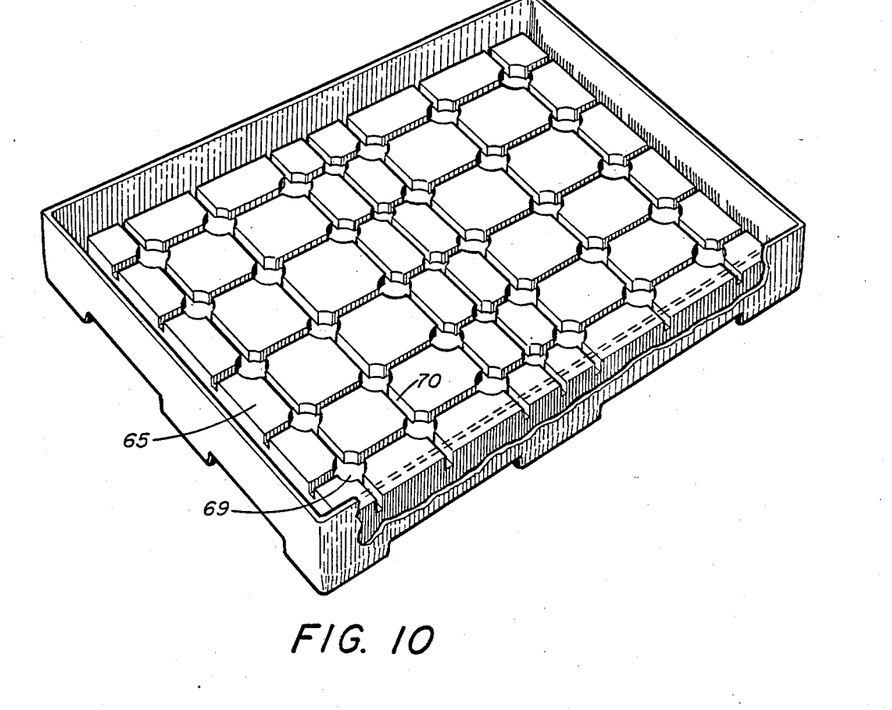
FIG. 10 is a photograph of the bottom planar surface of the lid of FIG. 9.

FIG. 10 further illustrates the bottom pallet layer 11 with tray 15 of FIG. 7 removed, thereby showing more completely the four positioning means 13 on the bottom pallet layer 11. The deep pockets of the photograph illustrate the legs 12.

FIGS. 9 and 10 show the lid 23 for the pallet-type package 10 of FIG. 1. FIG. 9 shows the top planar surface 64 of the lid and FIG. 10 shows the bottom planar surface of the lid. FIG. 9 shows a raised grid of rectilinear walls 66 connected at their intersection by knobs 67. Also the lid has higher rigids 68 at each corner and has side panels 25. FIG. 10 shows the recesses 69 in the bottom planar layer 65 of lid 23 that correspond to the nobs 67 on the top planar surface 64 of lid 23. The channels 70 running between the recesses 69 on the bottom planar surface 65 correspond to the rectilinear walls 66 on the top planar surface 64 of lid 23. The recesses positively position the tops 19 of bobbins of yarn 18 shown in FIG. 1 for the last layer of bobbins of yarn. Although the rectilinear walls and channels shown connecting the recesses and knobs are preferred for adequately supporting the knobs and recesses in a molded article, the knobs and recesses are not absolutely necessary. Also the recesses could be apertures and the lid could essentially be another tray 15 or two trays where a tray layer is comprised of two trays where the two trays are linked together in some fashion. The knobs 67 at the corners of the lid along with the rigids 68 provide securing means for the unitizing means 28 of FIG. 1. Preferably the side panels 25 have a height of around 2 to 4 inches to adequately protect the uppermost yarn on the bobbins of yarn where the bobbins have a constricted cross-sectional dimension from the cross-sectional dimension of the base of the bobbin.

Figure 11:
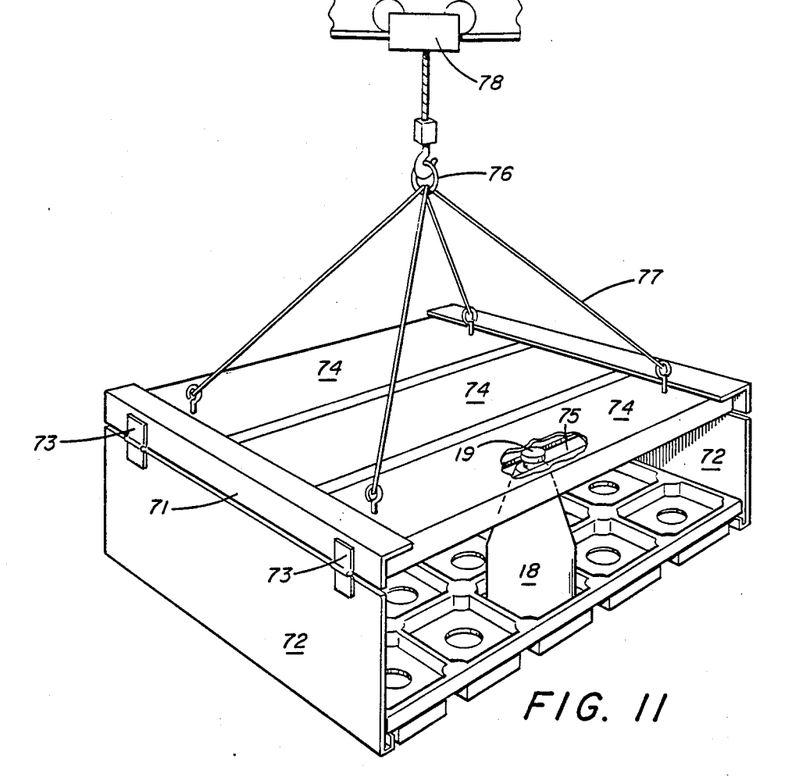
FIG. 11 is an isometric view of one tray having one bobbin for illustrative purposes and the material handling means for removing the trays from the pallet-type package.

FIG. 11 illustrates how the tray 15 can be removed by a materials handling means 71 from the pallet-type package. Each tray 15 can be grasped with a material handling means 71 via the tray's material handling receiving means 62 and 63. Any material handling means known to those skilled in the art for lifting plates or slabs can be used where the material handling receiving means 62 and 63 for the tray are properly designed to suit the specific material handling means 71. A preferred material handling means is illustrated in FIG. 11 having grasping means 72 which are movably affixed by attachment means 73 to a bobbin stabilizing means 74. The stabilizing means 74 is adapted to receive the bobbin tops 19 and to maintain the placement of the bobbins of yarn on the tray 15 as it is removed from the pallet-type package 10 of FIG. 1. The bobbin stabilizing means 74 has a channel 75 into which the bobbin tops 19 fit. The bobbin stabilizing means 74 preferably has this adaption by way of at least a channel 75 which is constructed to accommodate an entire external row of bobbin tops. The external rows are those occupying the peripheral recesses of the tray. If there are two channels, one each for each row of bobbin yarn occupying recesses adjacent to external longitudinal walls, then the bobbin yarn occupying recesses having external traversing walls can be retained by properly designed grasping means 72. Such grasping means 72 would be a side-panel-type grasping means as shown in FIG. 11. Therefore, preferably, there are a plurality of bobbin stabilizing means 74 in the material handling means generally indicated as 71 or one stabilizing means 74 having a plurality of channels 75 so that in either case there is a channel for each row of bobbin tops. The material handling means 71 has attachment means 73 to connect the grasping means 72 to a focal point means 76. This enables the material handling means 71 and a tray full of bobbins of yarn to be lifted, but only one bobbin yarn 18 is illustrated in FIG. 11. The attachment means 73 can be connected to the lift focal point means 76 through any connecting means 77 known to those skilled in the art such as metal wire, ropes, strings or other connecting means. The lift focal point means 76 can be any suitable mechnical device for enabling lifting of the material handling means 71. As shown in FIG. 11, an overhead hoist 78 is used to hook the lift focal point means 76 of the material handling means 71 to remove the tray from the pallet-type package. Any hoist device known to those skilled in the art can be utilized, even those operated manually and those operated with forklift trucks.

Figure 12:
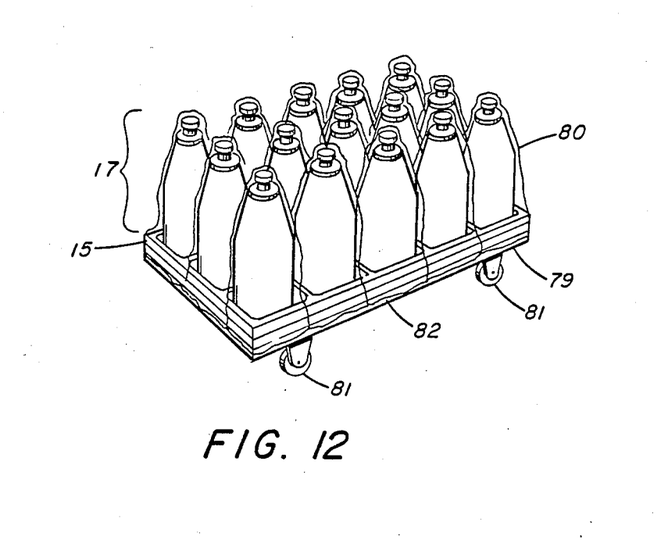
FIG. 12 is an isometric view of one layer of bobbins on one tray on a tray delivery means for transporting the bobbins to a yarn utilizing machine.

FIG. 12 illustrates a tray 15 of bobbins of yarn with wound layers of yarn 26, where the tray 15 is positioned on a tray delivery means 79. As shown in FIG. 12 the entire tray 15 can be covered with a protective wrap 80 to protect the bobbin yarn from fingerprints, dust, dirt and to generally maintain cleanliness of the bobbin yarn. The protective wrap can be the same as the protective film that can be used around each bobbin of yarn 18 as indicated in FIG. 2. As indicated in FIG. 2, when protective film is used which can be any polymeric film including polyethylene film, shrink wrap film, or stretch wrap film, the film must be of a certain thickness to allow the film to deform sufficiently to enable nesting of the bobbins. If both protective films, the individual bobbin film and tray film are used, the total thickness of these two films must be adequate to allow the deformation of the films to enable nesting of the bobbins. The delivery means 79 in FIG. 12 can be any device having a number of wheels 81 attached to any supporting frame 82 to allow the tray 15 of bobbins of yarn 18 to be transported from an unloading area to an area close to the yarn utilizing machine. Nonexclusive examples of vehicle delivery means include dollies, wagons and the like.

The invention has been illustrated above giving a detailed description of the embodiment and also the preferred embodiment, but the invention is in no way limited to the specific material of construction or to the specific dimensions given. The pallet-type package can be designed for any feasible number of bobbin yarn packages and it is not limited to the specific structure shown in the figures. Any material and any structure of sufficient strength to accommodate the flanges of the bobbins can be used.

We claim:

1. A pallet-type package of bobbin yarn with reusable structural parts for transporting and storing a plurality of bobbin yarn, where the package enables the unloading of discrete units of a plurality of bobbin yarn, comprising:
   (a) a bottom pallet layer with at least one positioning means;
   (b) a plurality of layers of nestable bobbin yarn as a structural component of the package,
      where the bobbin yarn has a reusable bobbin having a base, core, top and a plurality of superimposed annular layers of yarn on the core between the base and the top, and
      where the base has an open-ended bottom with a cavity extending into the core where the cavity is dimensioned to accommodate a top of a bobbin of yarn, and where the base has a circular flange of greater circumference than that of the cross-section of the tubular core, and where the top has a circular shoulder and a circular constructed neck above the shoulder and an outwardly extended circular collar with the longitudinal plane parallel to the longitudinal plane of the shoulder, where the shoulder, neck and collar are sized in lengths to permit nesting of the bobbins by inserting the collar and neck to the shoulder of the top of a bobbin into the cavity of the tubular core of the open-ended bottom of the next vertically adjacent bobbin yarn,
   (c) a plurality of layers of trays with at least one tray per layer where the trays are reusable structural components of the package,
      where a tray layer is interspersed between each layer of nestable bobbin yarn, and where a tray layer is associated with the bottom pallet layer through that layer's positioning means, and
      wherein each tray has top and bottom planar surfaces, where the top planar surface has a plurality of walls defining a plurality of row recesses by the location of the walls on the perimeter of the tray and on the interior surface of the top planar surface, where the walls are dimensional to positively position the circular flanged base of each bobbin yarn in the layer of bobin yarn in at least one recess, and
      wherein each tray has aligned apertures in a grid-like fashion through both the top and bottom planar surfaces of the tray, where the apertures are associated with the recesses so that for each bobbin yarn positively positioned in a recess the cavity of each bobbin yarn is aligned with an aperture so that the tops of each bobbin yarn from the layer of bobbin yarn underneath the tray occupies an aperture vertically aligned with the underlying bobbin so that the underlying bobbin yarn nests with the bobbin yarn positively positioned on the tray, wherein the tray has effective longitudinal and traverse reinforcement means, and wherein each tray has material handling receiving means; and (d) a lid with a plurality of bobbin top receiving means to secure the tops of the plurality of bobbin yarn for the last layer of bobbin yarn, (e) a protective wrap disposed to protect the cleanliness of the yarn on the bobbin yarn, (f) a unitizing means to hold the layers of trays and bobbin yarn and lid and bottom pallet layer as a unit package.

2. The package of claim 1, wherein the bottom pallet layer and at least one tray positioned on the bottom pallet layer is through the positioning means of being one molded article.

3. The package of claim 1, wherein the positioning means on the bottom pallet layer constitutes a nub to occupy an aperture of each tray positioned on the pallet layer.

4. The package of claim 1, wherein the protective wrap is a separate film wrap around each bobbin where the film has a thickness to allow the film to deform sufficiently to enable nesting of the bobbin.

5. The package of claim 1, wherein the protective wrap is a separate film wrap around each tray where the film has a thickness to allow the film to deform sufficiently to enable nesting of the bobbins.

6. The package of claim 1, wherein the protective wrap is a film wrap around the side and top exterior surfaces of the package.

7. The package of claim 1, wherein the protective wrap is a separate film wrap around each bobbin and another separate film wrap around each tray, where the total thickness of the film allows the film to deform sufficiently to enable nesting of the bobbins.

8. The package of claim 1, wherein the protective wrap is around each bobbin, each tray and the exterior side and top surfaces of the package.

9. The package of claim 1, wherein two trays are interspersed between each layer of bobbin yarn constituting a tray layer.

10. Pallet-type package of claim 1, wherein the apertures of the tray are circular apertures which securely hold the tops of the bobbins occupying the apertures from the underlying layer of bobbin yarn.

11. The package of claim 1, wherein the trays are molded high density polyethylene.

12. The package of claim 1, wherein the trays are solid rectangular trays, wherein the top planar surface has a grid of rectilinear longitudinal and traversing walls to define the row recesses having bottom layers that are the top planar surface of the tray and where the grid-like fashion of apertures is disposed so that there is one aperture per recess, and the reinforcement means are the two external longitudinal walls, and where traverse reinforcement is provided by the traverse rectilinear walls.

13. The package of claim 12, wherein the reinforcement is from metallic reinforcing bars in a shape selected from the group consisting of bars, T-shaped members and angles and at least one traversing exterior wall is hollow to accommodate along its length the metallic reinforcing bars selected from the shapes consisting of bars, T-shaped members and angles.

14. Package of claim 12, wherein the trays have 15 recesses to accommodate 15 bobbins of yarn.

15. The package of claim 1, wherein the tray has a plurality of walls that are walls around the periphery of the tray and a plurality of traversing walls to define a plurality of row recesses where each recess has a plurality of the apertures arranged in a row with each aperture equidistant from the adjacent aperture and where both the internal and peripheral traversing walls positively position the bases of the bobbin yarn by providing contact for two opposed sides of each base.

16. Package of claim 15, wherein there are four interior traversing walls that along with the two peripheral traversing walls define five row recesses, where each recess has three apertures and where both the internal and peripheral traversing walls are dimensioned to provide arcuate contact to opposite sides of each base which is a circular flange.

17. Package of claim 1, wherein both the spent bobbins are nestable and spent trays are nestable for reuse.

18. Package of claim 1, wherein the lid has one recess for each top of bobbin yarn of the underlying layer, and has a plurality of side panels to protect the bobbin yarn from the unitizing means and has a plurality of unitizing support means.

19. A packaging system for a plurality of bobbin yarn with reusable parts for transporting and storing the bobbin yarn to allow for unloading of discrete units of a plurality of bobbin yarn and conveyance of the bobbin yarn to the yarn utilization machine, comprising:

a. a pallet-type package comprising:

(1) a bottom pallet layer with at least one positioning means, (2) a plurality of layers of nestable bobbin yarn as a structural component of the package, where the bobbin yarn has reusable bobbins having a base, core, top and a plurality of superimposed annular layers of yarn on the core between the base and the top, and where the base has a cavity extending into the core where the cavity is dimensioned to accommodate a top of a bobbin yarn, (3) a plurality of trays as reusable structural components of the package where at least one tray is interspersed between each layer of nestable bobbin yarn, and where at least one tray is associated with the bottom pallet layer through that layer's positioning means, and wherein each tray has top and bottom planar surfaces where the top planar surface has a plurality of walls defining a plurality of row recesses by the location of the walls on the perimeter of the tray and on the interior surface of the top planar surface where the walls are dimensioned to positively position the base of each bobbin yarn in the layer of bobbin yarn in at least one recess, and wherein each tray has aligned apertures arranged in a grid-like fashion in both the top and bottom planar surfaces of the tray where the apertures are associated with the recesses so that with each bobbin yarn positively positioned in a recess the cavity of each bobbin yarn is aligned with an aperture so that the tops of each bobbin yarn from the layer of bobbin yarn underneath the tray occupies an aperture vertically aligned with the underlying bobbin to nest with the bobbin yarn positively positioned on the tray, wherein the tray has reinforcement means in at least one longitudinal wall and a plurality of traverse walls which render transverse strength, and wherein the tray has at least two material handling receiving means located at opposite ends of the tray from each other, and (4) a lid with a plurality of recesses, one for each top of the bobbin yarn of the underlying layer of bobbin yarn and has a plurality of side panels to protect the bobbin yarn from the unitizing means and a plurality of unitizing support means, (5) a protective wrap disposed to protect the cleanliness of the yarn on the bobbin yarn, (6) a unitizing means to hold the layers of trays and bobbin yarn and lid and bottom pallet layer as a unit package, (7) a material handling means with griping means positioned opposite each other to contact the appropriate material handling receiving means, attachment means to allow the griping means to engage and disengage from the receiving means, bobbin stabilizing means connected to the griping means through the attachment means having a plurality of channels sufficient to accommodate each row of tops of bobbins, a connecting means to connect the material handling means to a mechanical focal point and a mechanical focal point means, and (8) tray delivery means for conveying one or more trays unloaded from the pallet-type package by the material handling device to the yarn utilization machine.

20. System of claim 19, wherein two trays are interspersed between each layer of nestable bobbin yarn constituting a tray layer.

21. Pallet-type package of claim 4, wherein the film wrap has a thickness up to 4 mils.

* * * * *